United States Patent [19]

Nguyen et al.

[11] Patent Number: 5,293,495
[45] Date of Patent: Mar. 8, 1994

[54] METHOD OF ADDRESSING DEVICES AND TRANSFERRING DATA ON A BUS

[75] Inventors: Uoc H. Nguyen; George L. Eldridge, both of Long Beach; Otto Sperber, Huntington Beach, all of Calif.

[73] Assignee: Xerox Corporation, Stamford, Conn.

[21] Appl. No.: 907,756

[22] Filed: Jun. 29, 1992

[51] Int. Cl.⁵ .......................................... G06F 13/38
[52] U.S. Cl. ..................... 395/325; 395/275; 370/85.1; 364/240.5; 364/240; 364/240.2; 364/DIG. 1
[58] Field of Search ............... 395/275, 325, 725, 425; 340/825.5; 370/60, 85.1

[56] References Cited

U.S. PATENT DOCUMENTS

| | | | |
|---|---|---|---|
| 4,212,080 | 7/1980 | Milliken | 364/900 |
| 4,415,985 | 11/1983 | McDaniel et al. | 364/900 |
| 4,570,220 | 2/1986 | Tetrick et al. | 364/200 |
| 4,586,128 | 4/1986 | DeWoskin | 364/200 |
| 4,724,520 | 2/1988 | Athanas et al. | 364/200 |
| 4,862,451 | 8/1989 | Closs et al. | 370/60 |
| 5,056,011 | 10/1991 | Yoshitake et al. | 364/200 |
| 5,081,576 | 1/1992 | Ward | 395/325 |
| 5,097,483 | 3/1992 | Bechtolsheim | 375/17 |

Primary Examiner—Gopal C. Ray
Attorney, Agent, or Firm—Robert Cunha

[57] ABSTRACT

A method is described for transferring data on a digital data bus system. The bus system includes a bus having a clock line for communicating a clock signal, address lines for communicating address signals, data lines for communicating data signals, and control lines for communicating control signals. A bus controller is connected to the bus. A plurality of devices are also connected to the bus. Each device has a predetermined address. The control lines include a bus grant line for communicating a bus grant signal that permits the devices addressed by the bus controller to send or receive data signals. According to the method, the bus controller generates a bus grant signal on the bus grant line and source address and destination address signals on the address lines. The devices receive the bus grant signal and the source address and destination address signals. The devices decode the source address and destination address signals in response to the bus grant signal. The device having the predetermined address corresponding to the decoded source address signal transfers the data signals along the data lines, in response to the bus grant signal and the decoded source address signal. Finally, the device having the predetermined address corresponding to the decoded destination address signal receives the data signals sent by the addressed source device, in response to the bus grant signal and the decoded destination address signal.

2 Claims, 6 Drawing Sheets

METHOD OF ADDRESSING DEVICES AND TRANSFERRING DATA ON A BUS

This invention relates to a method for addressing devices on a bus, and in particular to a method for addressing the devices and transferring data signals on the bus.

BACKGROUND

A common arrangement for low end microcomputer systems places system elements, such as the central processing unit (CPU), main memory (e.g., random access memory, or RAM), read only memory (ROM) and Input/Output (I/O) devices, on the same main bus. Communication on the main bus is through the CPU, an arrangement that can result in unacceptably slow transfer of data (e.g., from an I/O device to RAM). Moreover, devices on the main bus with lower priority, such as I/O devices, face long waits to make data transfers.

In response to these shortcomings, Direct Memory Access (DMA) controllers were developed. A DMA controller connects to the main bus, and is responsible for controlling data signal transfers on the main bus between RAM and I/O devices. To make data transfers, a DMA controller takes control of the main bus when the CPU is not using it (i.e., cycle stealing). Although DMA controllers generally perform adequately, DMA controllers suffer from certain limitations. With a DMA controller, the rate of data transfer is limited by how frequently the CPU allows the DMA controller to gain control of the main bus, and how long the DMA controller can keep control of the main bus. Moreover, DMA controllers are not designed to facilitate data signal transfers between I/O devices: Typically a DMA controller transfers data signals, one word at a time, to or from a particular (i.e., addressed) memory location in RAM.

Another response to the shortcomings of using only the main bus was the mezzanine bus. A mezzanine bus is a second or auxillary bus that is parallel to the main bus, and also is connected to the main bus through a bus to bus interface. The mezzanine bus connects most, if not all, of the I/O devices that would otherwise connect directly to the main bus. In this manner, the I/O devices on the mezzanine bus can transfer data signals between each other without the need to communicate over the main bus. The mezzanine bus includes a bus controller, and may even include a DMA controller.

SUMMARY OF THE INVENTION

A method is disclosed for transferring data signals in a digital data bus system. The bus system includes a bus having a clock line for communicating a clock signal, address lines for communicating address signals, data lines for communicating data signals, and control lines for communicating control signals. A bus controller is connected to the bus. A plurality of devices are also connected to the bus. Each device has a predetermined identification or address. The control lines include a bus grant line for communicating a bus grant signal that permits the devices addressed by the bus controller to send or receive data signals. According to the method, the bus controller generates a bus grant signal on the bus grant line and source address and destination address signals on the address lines. The devices receive the bus grant signal and the source address and destination address signals. The devices decode the source address and destination address signals in response to the bus grant signal. The device having the predetermined address corresponding to the decoded source address signal transfers the data signals along the data lines, in response to the bus grant signal and the decoded source address signal. Finally, the device having the predetermined address corresponding to the decoded destination address signal receives the data signals sent by the addressed source device, in response to the bus grant signal and the decoded destination address signal.

According to one aspect of the invention, the bus controller generates the source address signals on address lines other than address lines on which the bus controller generates the destination address signals.

According to another aspect of the invention, each device includes both a destination address and a source address. Data signals are sent by the device having the predetermined source address corresponding to the decoded source address. Furthermore, data signals are received by the device having the predetermined destination address corresponding to the decoded destination address signals.

According to another aspect of the invention, the addressed source device transfers data signals consisting of a predetermined number of data words, and the addressed destination device receives the predetermined number of data words. Moreover, an addressed source device includes a source First In First Out register (FIFO) for storing at least the predetermined number of data words, and an addressed destination device includes a destination FIFO for storing at least the predetermined number of data words. The addressed source device transfers data signals by transferring the predetermined number of data words from the source FIFO on the data lines, and the addressed destination device receives the predetermined number of data words into the destination FIFO from the data lines.

According to another aspect of the invention, the bus controller generates a bus grant signal on the bus grant line having a first logic level, and maintains the first logic level until all but one of the predetermined number of data words have been sent by the addressed source device. Then the bus controller replaces the bus grant signal having the first logic level with a bus grant signal having a second logic level before or during the sending of the last of the predetermined number of data words by the addressed source device.

According to a final aspect of the invention, a method is disclosed for transferring data signals in a digital data bus system. The bus system includes a bus having a clock line for communicating a clock signal, address lines for communicating address signals, data lines for communicating data signals, and control lines for communicating control signals. A bus controller is connected to the bus for controlling the bus. The bus controller communicates bus address assignments on the address lines. A plurality of devices are each connected to the bus. Each device is capable of being programmed with a bus address by the bus controller. The control lines include a bus grant line and device select lines. The bus grant line communicates a bus grant signal for permitting devices addressed by the bus controller to send or receive data signals. The device select lines communicates device select signals that enable the selected device to receive a bus address assignment from the bus controller. According to the method, the bus controller generates a device select signal on the device select lines and a device address signal on the address lines. The device selected by the device select signal receives the device address signal. The bus controller generates a bus grant signal on the bus grant line and source address and destination address signals on the address lines. The devices receive the bus grant signal and the source address and destination address signals, and decode the source address and destination address signals in response to the bus grant signal. The device having the predetermined address corresponding to the decoded source address signal transfers data signals in response to the bus grant signal and the decoded source address signal. Finally, the device having the predetermined address corresponding to the decoded destination address receives the data signals sent by the addressed source device, in response to the bus grant signal and the decoded destination address signal.

DESCRIPTION OF THE PREFERRED EMBODIMENT

SYSTEM ELEMENTS

Figure 1:
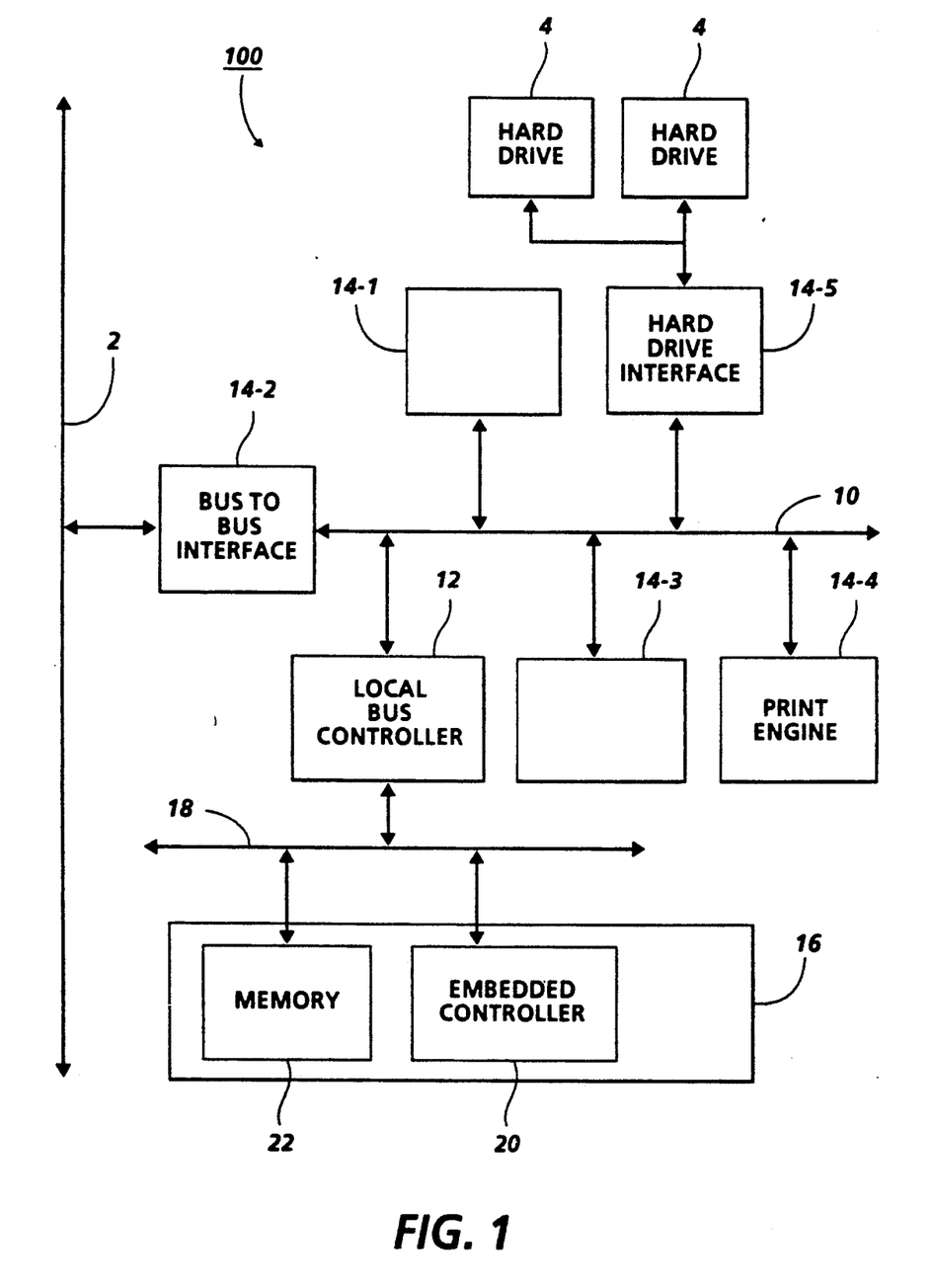
FIG. 1 is a system block diagram of a bus system, embodying the method of the present invention, that includes a local bus, local bus controller, and devices connected to the local bus.

Referring now to FIG. 1, there is shown a system block diagram of the control subsystem 100 that controls a laser printer (not shown). Control subsystem 100 includes a microcomputer 16 having embedded controller 20 and memory 22 (i.e., ROM and RAM) connected by means of main bus 18. Preferably embedded controller 20 is an AMD 29200, a 32 bit machine. Control subsystem 100 further includes local bus 10, which is controlled by bus controller 12, and five devices 14 that are connected to local bus 10. Devices 14 include specialized hardware designed to perform some of the image processing tasks associated with printing, such as device 14-1 and device 14-3. Devices 14 also include device 14-4 for interfacing with a xerographic print engine (not shown), device 14-5 for connecting local bus 10 to hard drives 4, and device 14-2 for connecting local bus to to local area network (LAN) 2. Local bus 10 operates in parallel with main bus 18, and off-loads from main bus 18 the data signal transfers between devices 14. Local bus 10 connects to main bus 18 through bus controller 12.

In brief, referring now to FIGS. 1, 2, 3 and 4, local bus 10 Is a high speed synchronous, parallel, digital data bus capable of exchanging data signals 25 among devices 14, and between devices 14 and bus controller 12. Local bus 10 includes a clock line 23 for communicating a high speed clock signal 61, data lines 24 for communicating data signals 25, address lines 26 for communicating address signals 27, and control lines 28 for communicating control signals, such as bus grant control signal 63. Clock signal 61 preferably has a frequency of 20 MHz or greater, to allow for high speed transfer of data signals 25.

In accordance with the invention, address lines 26 communicate address signals 27 from bus controller 12 to devices 14 for two distinct purposes. Bus controller 12 uses address lines 26 In conjunction with data lines 24 and certain of control lines 28 to program a particular device 14, such as device 14-1, with one or more addresses on local bus 10. Once device 14-1 has been programmed with an address, bus controller 12 can use address lines 26 to actually address device 14-1.

Figure 2:
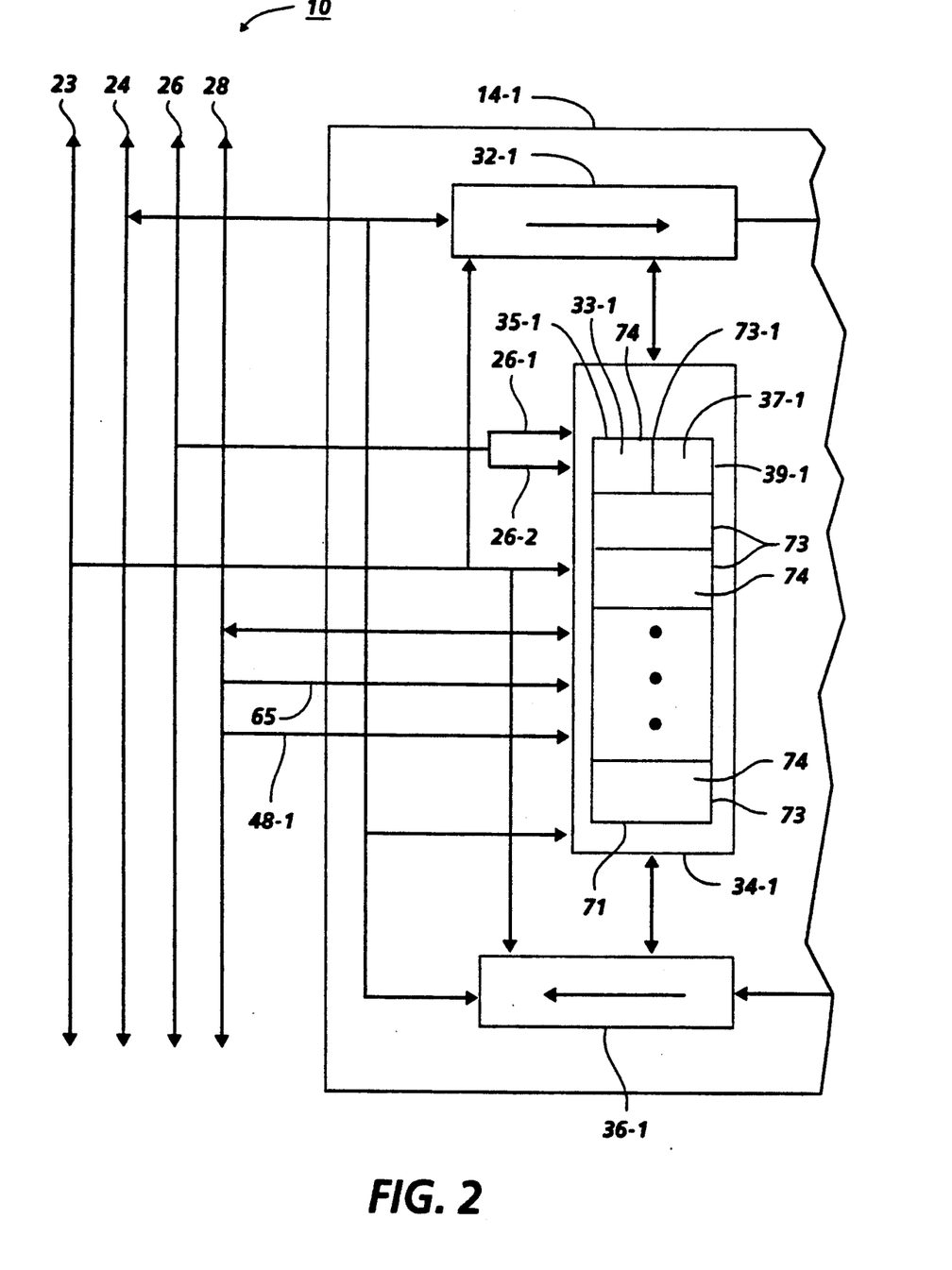
FIG. 2 is a block diagram of one of the devices shown in FIG. 1.

Preferably each device 14 can both send and receive data signals 25. Each device 14 has a separate, programmable address for sending data signals 25, known as the source address 37. Each device 14 also has a separate, programmable address for receiving data signals 25, known as the destination address 33. A particular device 14 may have a plurality of source addresses 37, destination addresses 33, or both a plurality of source addresses 37 and destination adresses 33.

Address lines 26 consist of ten parallel lines. With ten parallel lines, address lines 26 are capable of addressing $2^{10}$, or 1024 separate addresses. Of course, not all addresses need be used (e.g., FIG. 1 shows only five devices 14, for a total use of ten addresses 33 and 37), and the number of available addresses 33 and 37 can be varied by increasing or decreasing the number of address lines 26.

Preferably, address signals 27 for source addresses 37 are all conveyed by the lower half 26-1 of address lines 26 (i.e., the five least significant bits), and address signals 27 for destination addresses 33 are all conveyed by the upper half 26-2 of address lines 26 (i.e., the five most significant bits). This addressing scheme reduces the number of available addresses to thirty-two (i.e., $2^5$) destination addresses 33 and thirty-two source addresses 37, but also simplifies the address encoding and decoding hardware, as discussed further below.

Preferably there are thirty-two parallel data lines 24, an arrangement that allows data signals 25 to be communicated as thirty-two bit words 55. Of course, a fewer or greater number of data lines 24 could be used (e.g., eight data lines 24 or sixty-four data lines 24 to allow eight bit and sixty-four bit data words 55, respectively). A thirty-two bit word size is chosen to match the word size of the microcomputer 16 and main bus 18, an arrangement that facilitates data transfer between bus 18 and local bus 10.

Figure 4:
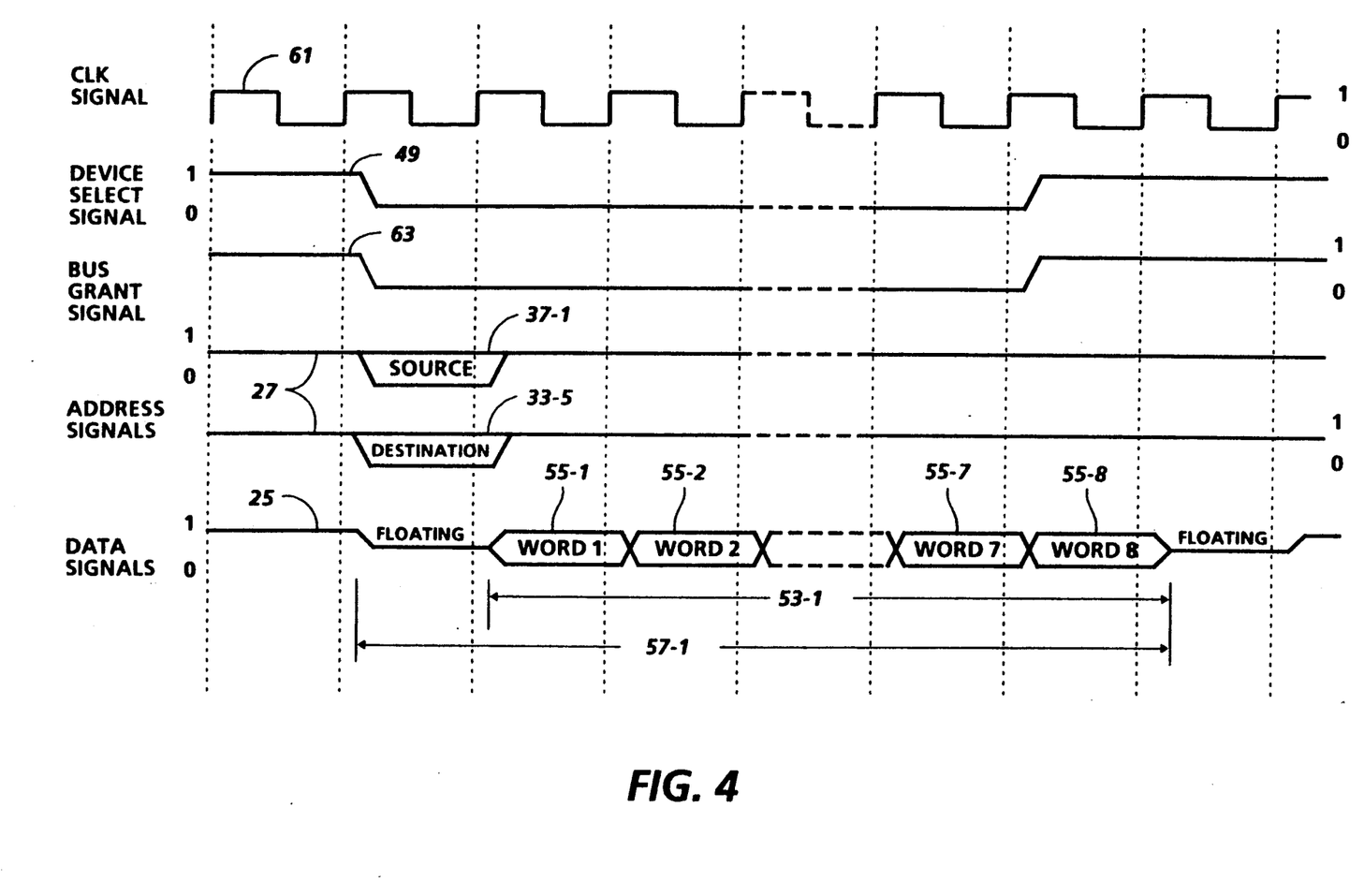
FIG. 4 is a timing diagram depicting the timing of data signals, representing a single communication request, sent from a source device to a destination device under control of the bus grant signal.
Figure 5:
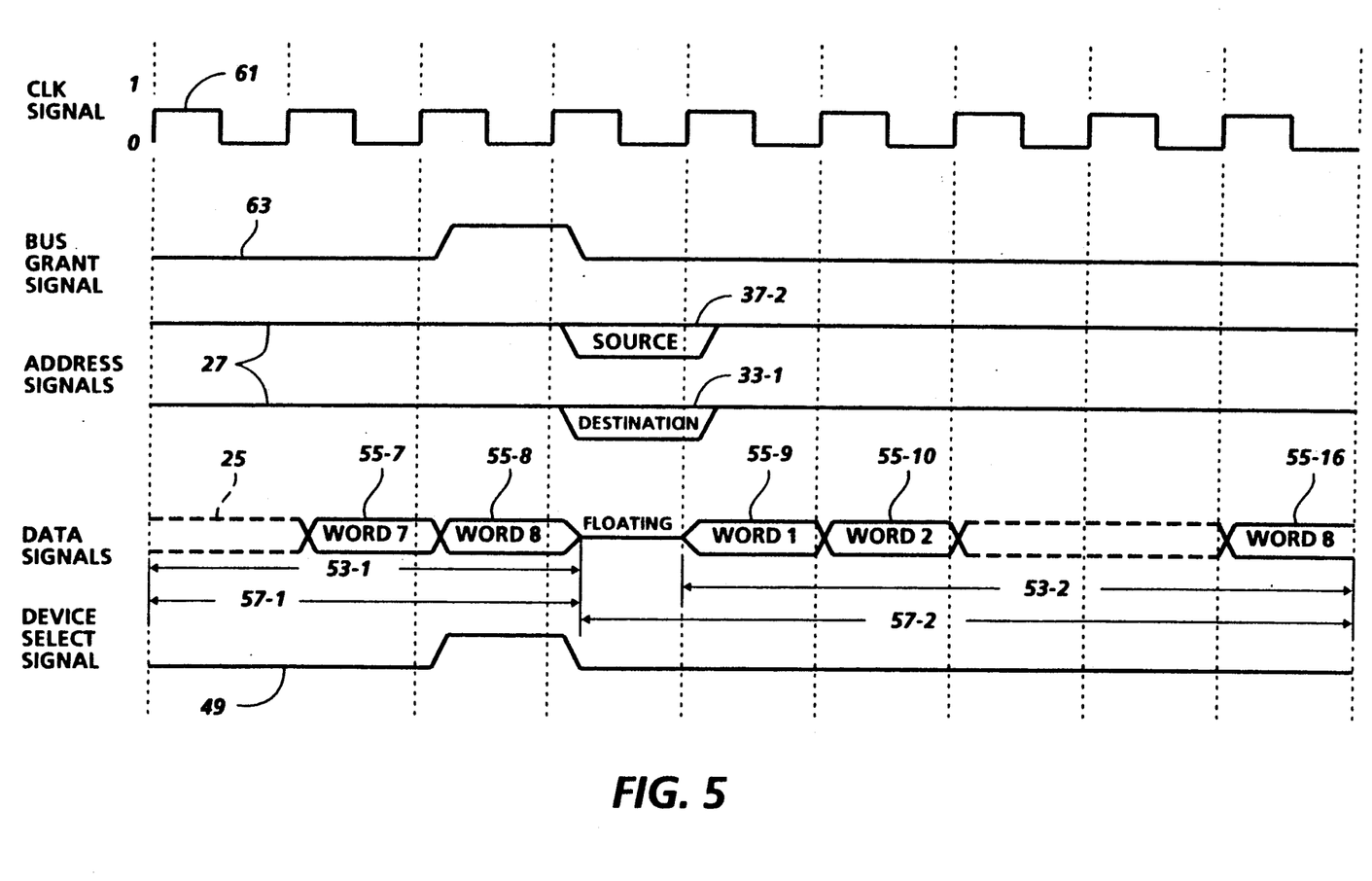
FIG. 5 is a timing diagram depicting the timing of data signals, representing a two consecutive communication requests, sent under control of the bus grant signal.

Referring now to FIGS. 1 and 4, data signals 25 are sent over data lines 24 in blocks or groups 53 having a fixed number of thirty-two bit words 55. Fixing the size of a block 53 reduces the overhead required to transfer the block 53. Of course, a fixed block size sometimes requires dummy words 55 to be inserted in the block 53 so the words 55 in a partially full source buffer 36 could still be sent as a full block 53. In FIG. 5 two data transfers 57 are shown. Preferably each data transfer 57 involves sending blocks 53 of eight words 55. Of course, the size of blocks 53 could be set at a number greater or fewer than eight.

Referring now to FIGS. 1, 2, and 4, each device 14 includes a destination buffer 32, connected to data lines 24, for storing data signals 25 sent on data lines 24 and addressed on address lines 26-1 to the destination address 33 of the device 14. Destination buffer 32 preferably consists of a thirty two bit by eight bit FIFO (First In, First Out register), a size that allows buffer 32 to store one entire block 53 of eight thirty two bit data words 55. Of course, buffer 32 could be made deeper so that buffer 32 could store the data words 55 of multiple blocks 53.

Destination buffer 32 is controlled by device controller 34. Device controller 34 includes a destination address register 35 that contains the destination identification or address 33 of the device 14. The particular destination address 33 in destination address register 35 can be programmed by bus controller 12.

Each device 14 also includes a source buffer 36, connected to data lines 24, for storing data signals that the device 14 desires to be sent on to local bus 10 from the source address 37 of the device 14. Similar to destination buffer 32, source buffer 36 consists of a thirty two bit wide by eight bit deep FIFO, and is controlled by device controller 34. Device controller 34 includes a source address register 39 that contains the source identification or address 37 of the device 14. The particular source address 37 in source address register 39 can be programmed by bus controller 12.

FIFOs are preferred for buffers 32 and 36 because they allow rapid input and output of blocks 53 of words 55. Moreover, using FIFOs for buffers 32 and 36 allow devices 14 to operate asynchronously from local bus 10. The internal clock rate of device 14 can thus differ from the rate of clock signal 61 of local bus 10.

Figure 3:
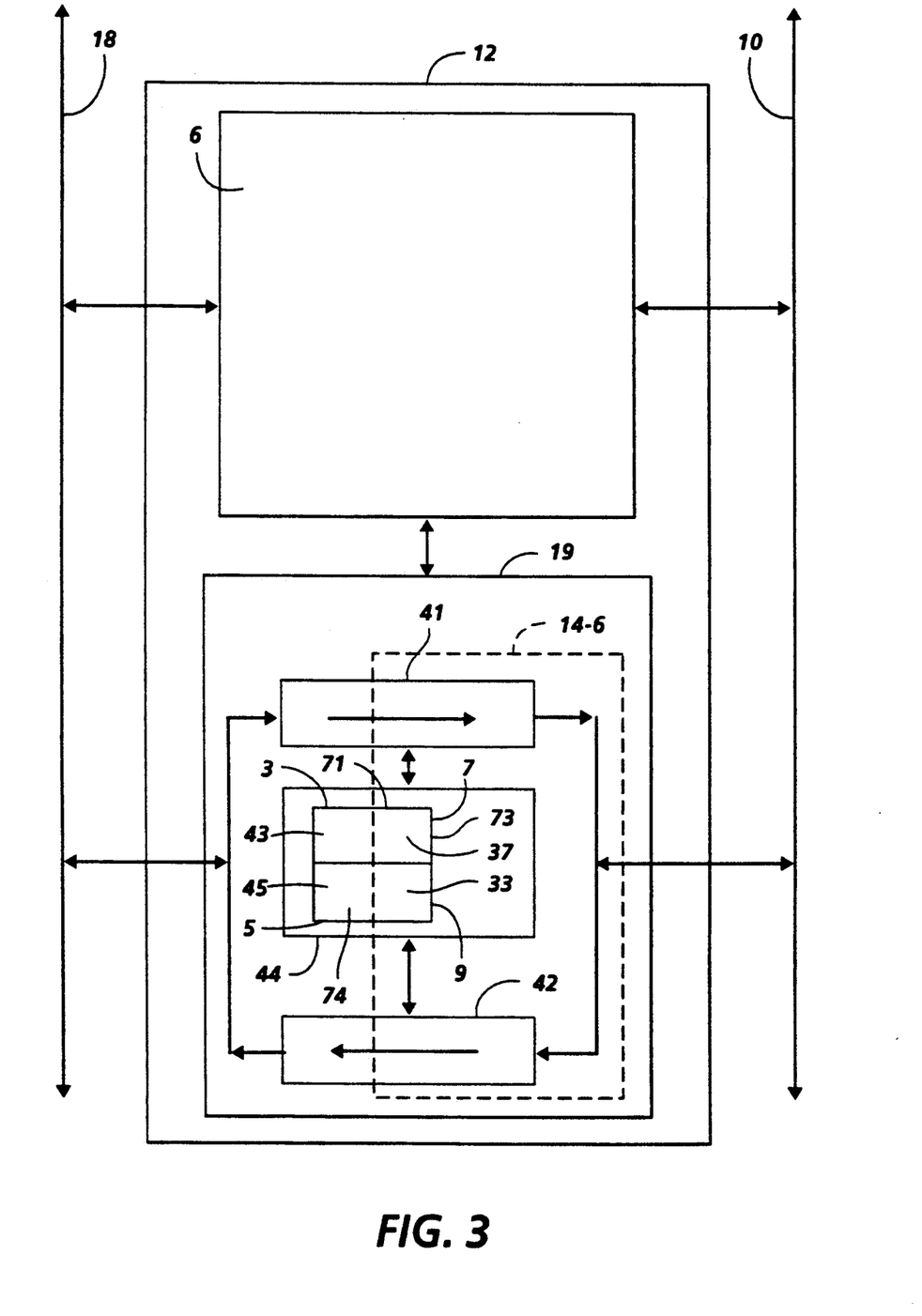
FIG. 3 is a block diagram of the local bus controller shown in FIG. 1.

Referring now to FIGS. 1 and 3, bus controller 12 includes control logic 6 for controlling bus controller 12, and bus interface 19 for connecting main bus 18 and local bus 10. Bus interface 19 includes buffers 41 and 42, and interface controller 44 for controlling bus interface 19. Interface controller 44 includes respective main bus address registers 3 and 5, and respective local bus address registers 7 and 9 for respective buffers 41 and 42. Buffers 41 and 42 are preferably FIFOs, for reasons discussed above. Buffer 41 serves to transfer data signals 25 from main bus 18 to local bus 10. Buffer 41 has a destination address 43 on main bus 18 and a source address 37 on local bus 10. The destination address 43 is stored in main bus address register 3. Preferably destination address 43 is fixed, or at least some default value for address 43 is known to microcomputer 16. Source address 37 is programmable and stored in local bus address register 7. In operation, buffer 41 stores data signals received from bus 18 that are addressed to buffer 41. At the direction of bus controller 12, buffer 41 transfers the data signals 25 received from main bus 18 on to local bus 10.

Buffer 42 serves to transfer data signals 25 from local bus 10 to main bus 18. Buffer 42 has a programmable destination address 33 on local bus 10, and a programmable source address 45 on main bus 18. Destination address 33 is stored in bus address register 9, and source address 45 is stored in main bus address register 5. In operation, interface controller 44 instructs buffer 42 to store the data signals 25 received from local bus 10 that are addressed to the destination address 33 of buffer 42. At the direction of bus controller 12, interface controller 44 instructs buffer 42 to write these data signals 25 onto main bus 18 from a source address 45 on bus 18.

To devices 14 on local bus 10, bus interface 19 appears as just another device 14. That is, data signals 25 of data transfers 57 are sent to and from bus interface 19 on local bus 10 as if bus interface 19 were another device 14. The appearance of bus interface 19 as a device 14 on local bus 10 is signified in FIG. 3 by enclosing portions of bus interface 19 in a dotted rect creating a virtual device 14-6. Symbolically, device 14-6 includes local bus address registers 7 and 9 of interface controller 44, as well as the ends of buffers 41 and 42 adjacent local bus 10.

For proper operation, devices 14 and bus interface 19 require programming and control from bus controller 12 beyond programming of the destination and source addresses 33 and 37. For example, bus controller 12 should be able to flush or reset respective destination and source buffers 32 and 36 of devices 14. For this additional control and programming, the device controller 34 of each device 14 and the interface controller 44 of bus interface 19 include a bank 71 of command registers 73. Each command register 73 can be programmed with a control word 74 by bus controller 12.

Bus controller 12 uses control words 74 both to configure and to control devices 14 and bus interface 19. Configuring includes programming addresses 33 and 37. Controlling includes ordering a device 14 to initiate a self-test, or ordering the immediate resetting of source buffer 36.

For devices 14, preferably address registers 35 and 39 are part of bank 71 of command registers 73, rather than being a separate structure of registers. In particular, destination address register 35 and source address register 39 are in the respective most and least significant halves of a particular command register 73-1. Similarly, destination address 33 and source address 37 are stored in the respective most and least significant halves of the control word 74 in command register 73-1. Similarly, for bus interface 19 preferably address registers 3, 5, 7 and 9 are also part of a bank 71 of control registers 73 contained in interface controller 44.

Bus controller 12 performs many functions beyond those performed by bus interface 19. In particular, bus controller 12 determines what communications (i.e., data transfers between a pair of devices 14, as well as data transfers between a device 14 and bus interface 19) are requested on local bus 10, and decides when and in what order the communication requests will be granted. Several methods for accomplishing these tasks are well known to those skilled in the art. Preferably, bus controller 12 determines what communications are requested on local bus 10 in accordance with the method disclosed in a copending U.S. Patent application, by some of the same inventors as the present application, entitled, "Method of Determining Devices Requesting the Transfer of Data Signals on a Bus," and hereby incorporated by reference.

ADDRESS AND OTHER CONTROL WORD PROGRAMMING

Referring now to FIGS. 1, 2, 3 and 6, bus controller 12 programs addresses 33, 37 and 45, as well as the contents 74 of other command registers 73, under control of commands from microcomputer 16. Microcomputer 16 typically contains the address assignments for devices 14 and bus interface 19 (including device 14-6) in main memory 22. Typically addresses 33, 37 and 45 are programmed upon startup or reset of microcomputer 16.

Bus controller 12 programs command registers 73, including command register 73-1 containing destination and source addresses 33 and 37, using address lines 26 in conjunction with data lines 24 and device select lines 48. Address lines 26 convey address signals 27 that contain the address 102 of the particular command register 73 being programmed. Ten address lines 26 allow addressing a possible 1024 (i.e., $2^{10}$) command registers 73 in each device 14. Data lines 24 convey data signals 25 representing a control word 74. Each control word 74 is thirty two bits wide, the width of data lines 24.

Device select lines 48 are part of control lines 28. One unique device select line 48 connects each possible device 14 (except device 14-6 of bus interface 19) to bus controller 12. There is a maximum of thirty one device select lines 48, a number that is one less than thirty-two, the number of possible devices 14, to account for the connection to device 14-6 that is made internal to bus controller 12. For device 14-6, the equivalent to device select line 48 is performed internal to bus controller 12. Using internal connections to program device 14-6 avoids including in local bus 10 a device select line 48 for device 14-6. Each device select line 48 can communicate a device enable signal 49 that enables its associated device 14, among other things, to receive data signals 25 representing control words 74 and address signals 27 representing the address of a particular command register 73 in bank 71.

Figure 6:
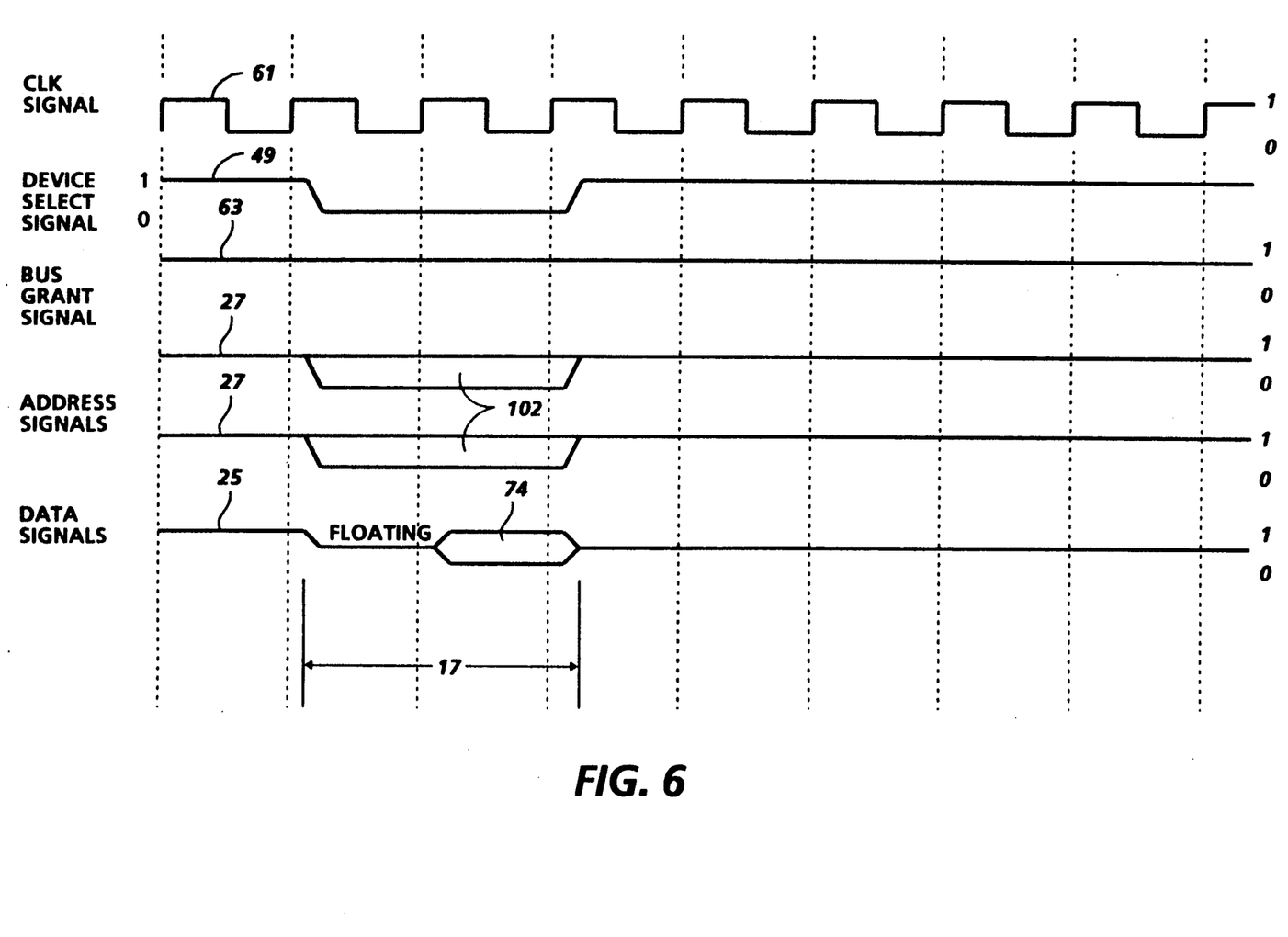
FIG. 6 is a timing diagram depicting the timing of address signals sent from the bus controller to a device to program that device with source and destination addresses.

In FIG. 6 there is shown one command programming cycle 17, which consists of two clock signal 61 cycles. Before the start of command programming cycle 17, the device enable signal 49 on all device select lines 48 Is a logic one (i.e., a high state). Similarly, the address signals 27 on all address lines 26 are logic ones, and the data signals 25 on all data lines 24 are logic ones. To program a particular device 14-1 with addresses 33-1 and 37-1, bus controller 12 communicates a logic zero device enable signal 49 on the device select line 48-1 associated with device 14-1 while placing address signals 27 the address 102 of command register 73-1 on address lines 26. All other device select lines 48 are maintained with a logic one device enable signals 49.

In response to a logic zero device enable signal 49 on device select line 48-1, device controller 34-1 decodes address signals 27 for the address 102 of command register 73-1 from address lines 26. Bus controller 12 maintains address signals 27 for command register 73-1 on address lines 26 for a sufficient number of clock signals 61 cycles to ensure decoding of address signals 27 by device controller 34-1. Preferably two signal 61 cycles are sufficient. Device controller 34-1 decodes the address signals 27 and readies the command register 73-1 associated with address 102 to receive a new control word 74.

At the beginning of the next clock signal 61 cycle, bus controller 12 places on data lines 24 data signals 25 representing the particular control word 74 to be placed in command register 73-1 (i.e., the control word 74 that contains addresses 33-1 and 37-1). Bus controller 12 maintains data signals 25 for control word 74 on data lines 24 for a sufficient number of clock signals 61 cycles to ensure decoding of data signals 25 by device controller 34-1. Preferably a single clock signal 61 cycle is sufficient. Device controller 34-1 decodes the data signals 24 and places the new control word 74 in command register 73-1. Thereafter, bus controller 12 ends programming cycle 17 and prepares for another possible programming cycle 17 by returning address signals 27 to logic ones and returning device enable signal 49 on device select line 48-1 from a logic zero to a logic one.

ADDRESSING SOURCE AND DESTINATION ADDRESSES FOR DATA TRANSFER

In brief, referring now to FIGS. 1, 2, 3, 4 and 5, bus controller 12 actually grants a particular data communication request (i.e., a request to transfer data among devices 14 or between a device 14 and device 14-6 of bus interface 19) using address lines 26 and bus grant line 65. Bus grant line 65 is a single line, one of control lines 28, that connects to each device 14 and to bus interface 19. Within each device 14, except for device 14-6, bus grant line 65 connects to device controller 34. For device 14-6, the equivalent of bus grant line 65 Is internal to bus controller 12.

In FIG. 4 there is shown on communication request 57, and in FIG. 5 there is shown two communication requests 57 granted by main controller 44, one followed closely by the other. In communication request 57-1, device 14-1 transfers data signals 25 to device 14-5. In communication request 57-2, device 14-2 transfers data signals 25 to device 14-1.

To grant communication request 57-1, bus controller 12 communicates bus grant signal 63 on bus grant line 65 while also placing address signals 27 for destination address 33-5 and source address 37-1 on address lines 26. In particular, bus controller 12 places address signals 27 for source address 37-1 on the five least significant bits 26-1 of address lines 26, and places address signals 27 for destination address 33-5 on the five most significant bits 26-2 of address lines 26. Bus controller 12 places address signals 27 for the destination and source addresses 33-2 and 37-1 on address lines 26 for a period of time sufficient for addresses 33-2 and 37-1 to be received and decoded by devices 14 and bus interface 19. Preferably, the receipt and decoding can be accomplished in a single clock signal 61 cycle. To signal to devices 14 and bus interface 19 that the address lines 26 will contain address signals 27 for addresses 33 and 37, the normally high (logic 1) bus grant signal 63 goes low (logic 0) and stays low.

In devices 14 and bus interface 19, device controllers 34 and interface controller 44, respectively, respond to the low state of bus grant signal 63 by decoding address signals 27 for respective addresses 33-5 and 37-1 from address lines 26. In response to its decoded source address 37-1, the addressed source device 14-1 transfers data signals 25 for a block 53-1 of words 55 on data lines 24. In particular, source control logic 38-1 instructs source buffer 36-1 to send onto data lines 24 data signals 25 for the first word 55-1 of eight words 55 that are stored in source buffer 36-1 as a block 53-1. Data signals 25 for the first data word 55-1 are placed on data lines 24 for one period of clock signal 61, after which source control logic 38-1 replaces the data signals 25 for first data word 55-1 on data lines 24 by data signals 25 for the second data word 55-2. Similarly, data signals 25 for second data word 55-2 are placed on data lines 24 for one period of clock signal 61 before in turn being replaced by data signals 25 for successive, clocked, words 55.

In response to its decoded destination address 33-5, addressed destination device 14-5 receives data signals 25 for data block 53-1. In particular, device controller 34-1 instructs destination buffer 36-5 to receive from data lines 24 data signals 25 for the first word 55-1 of eight words 55 that constitute data block 53-1. Thereafter, device controller 34-1 instructs destination buffer 36-5 to receive, in turn, the data signals 25 for the remaining seven words 55 of block 53-1.

To prepare for signaling the next communication request, request 57-2, bus controller returns bus grant signal 63 to a high state just prior to the completion of communication request 57-1. As shown in FIGS. 4 and 5, preferably bus grant signal 63 returns to the high state at the start of the transmission of data signals 25 for the last word 55-8 of data block 53-1.

In FIG. 5, communication request 57-2 is shown immediately following communication request 57-1: Bus grant signal 63 remains high on bus grant line 65 for one period of clock signal 61, then goes low to signal devices 14 and bus interface 19 that the next communication request 57-2 should be processed as described above for the previous communication request 57-1. Of course, were communication request 57-2 not pending, bus controller 12 would place bus grant signal 63 In a high state and keep bus grant signal 63 high until such time as bus controller 12 were ready to grant another communication request.

It is important that a particular source address 37 be assigned to only one source buffer 36 and 41 at a time. Otherwise, the drivers (not shown) of multiple source buffers 36 and 41 would be active on data lines 24 at the same time, a situation that not only would lead to the destination device 14 or bus interface 19 receiving incorrect data signals 25, but would likely damage the device drivers. Of lesser concern is the same destination address 37 being programmed into more than one destination buffer 32 or 42 at the same time, since only data errors, not hardware damage, would likely result.

As a safeguard to programming errors that assign multiple source buffers 36 or buffer 41 the same source address 33, preferably bus controller 12 includes a hardware safety. In particular, devices 14, bus controller 12 and bus interface 19 are constructed such that for a source buffer 36 and 41 to send data signals 25, not only must the source buffer 36 and 41 be addressed with address signals 27 for the appropriate source address 33, but the associated device 14 for source buffer 36 or bus interface 19 for buffer 41 must receive from bus controller 12 the device enable signal 49 on its device select line 48. In the case of device 14-6 of bus interface 19, bus controller 12 programs address register 39-6 with source address 37-6 according to a scheme (not shown) internal to bus controller 12. This scheme further only allows source buffer 36-6 to send data signals 25 on data lines 24 when the equivalent signal to bus enable signal 49 is directed to source buffer 36-6.

The device enable signal 49 is particularly useful since signal 49 is carried to each device 14 and to bus interface 19 by a dedicated device select line 48 (e.g., thirty-one device select lines 48, one for each possible device 14 except for device 14-6). In contrast, all devices 14 receive the bus grant signal 63 on the same bus grant line 65.

Bus controller 12 decides which of multiple source buffers 36 or buffer 41 with the same source address 33 at the same time should be sent the device enable signal 49. A number of possible approaches for making this decision would be well known to one skilled in the art. Preferably, device enable signal 49 duplicates bus grant signal 63. That is, like bus grant signal 63, device enable signal 49 goes low on bus grant line 65 when address signals 27 for addresses 33 and 37 are sent to devices 14, and goes high when data signals 25 for the last data word 55 in a block 53 are sent on data lines 24.

In each device 14 and in bus interface 19, device controller 34 and interface controller 44, respectively, monitor device select line 48 and bus grant line 65, as well as other control lines 28, to distinguish among the different meanings of device enable signal 49. That is, the meaning of device enable signal 49 must be considered in light of other control signals on control lines 28. For example, when the device controller 34 of a particular device 14 detects that there are low states for both bus grant signal 63 and the device select signal 49 for that particular device 14, the device controller 34 enables the particular device 14 to send data signals 25 from its source buffer 36. However, should the device controller 34 detect instead that device select signal 49 is low, but bus grant signal 63 is high, then the device controller 34 instead initiates programming of control registers 73 of bank 71 for the particular device 14. A similar function is performed by interface controller 44 for bus interface 19.

While the invention has been described with reference to the structures disclosed, it is not confined to the specific details set forth, but is intended to cover such modifications or changes as may come within the scope of the following claims.

We claim:

1. A method for transferring data in a digital data bus system from a selected data source of one device to a selected destination of another device, the bus system including a bus having a clock line for communicating a clock signal, address lines for communicating address signals, data lines for communicating data signals, and control lines for communicating control signals, a bus controller connected to the bus for controlling the bus, the controlling including communicating bus address assignments on the address lines, and a plurality of devices, each device having at least one data source or data destination, each device, source and destination being connected to the bus and capable of being programmed with a predetermined bus address by the bus controller, the control lines including a bus grant line and a device select line to each device from said controller, the bus grant line for communicating a bus grant signal for permitting devices addressed by the bus controller to send or receive data signals, the device select lines for communicating device select signals that enable the selected device to source data onto the data bus, the method comprising the steps of:

generating, by the bus controller, a device select signal on the device select line of the device having the selected data source;

receiving, by the device selected by the device select signal, the device select signal;

generating, by the bus controller, a bus grant signal on the bus grant line and source address and destination address signals on the address lines, both addresses being sent out at the same time on the address lines;

receiving, by the devices, the bus grant signal and the source address and destination address signals;

decoding, by the devices, the source address and destination address signals in response to the bus grant signal;

comparing, by each device, the decoded source and destination addresses to its own predetermined bus addresses to determine the selected source and destination;

sending, by the device having the predetermined address corresponding to the decoded source address signal, of data signals along the data lines, in response to the bus grant signal, the device select signal and the decoded source address signal; and receiving, by the device having the predetermined address corresponding to the decoded destination address signal, of the data signals sent by the addressed source device, in response to the bus grant signal and the decoded destination address signal.

2. The method according to claim 1, wherein the step of generating source address and destination address signals on the address lines by the bus controller includes the step of generating the source address signals on address lines other than address lines on which the destination address signals are generated.

* * * * *